Figure 1:
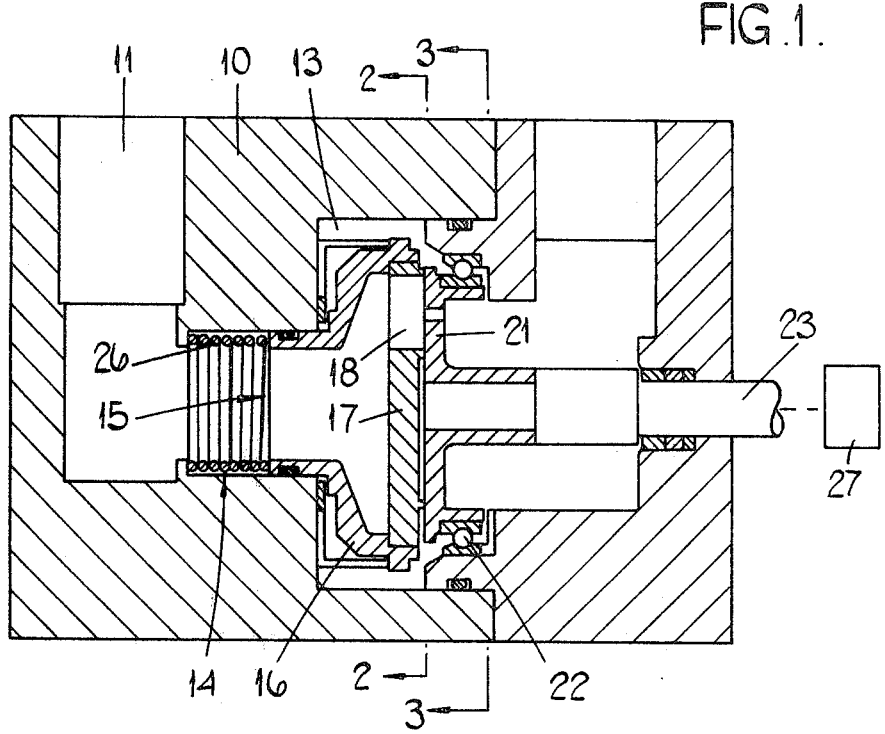

United States Patent [19]

Flynn

[11] 4,186,773
[45] Feb. 5, 1980

[54] CONTROL VALVES FOR FLUIDS

[75] Inventor: Derek J. Flynn, Solihull, England

[73] Assignee: Lucas Industries Limited, Birmingham, England

[21] Appl. No.: 813,706

[22] Filed: Jul. 7, 1977

[30] Foreign Application Priority Data

Aug. 18, 1976 [GB] United Kingdom ............... 34374/76

[51] Int. Cl.² ............................................. F16K 39/00
[52] U.S. Cl. ................................ 137/625.3; 251/208; 251/283; 251/304; 137/625.31
[58] Field of Search ....................... 251/208, 283, 304; 137/625.3, 625.31, 624.13

[56] References Cited

U.S. PATENT DOCUMENTS

| | | | |
|---|---|---|---|
| 2,364,697 | 12/1944 | Daniels | 251/283 |
| 2,822,000 | 2/1958 | Daniels | 251/283 |
| 2,889,852 | 6/1959 | Dunlap | 251/208 |
| 2,990,853 | 7/1961 | Sharp | 251/283 |
| 3,098,960 | 7/1963 | Huska | 137/624.13 |
| 3,320,870 | 5/1967 | Reffell | 251/208 |
| 3,414,007 | 12/1968 | Demarco | 251/208 |
| 3,987,819 | 10/1976 | Scheuermann | 251/208 |

FOREIGN PATENT DOCUMENTS

| | | |
|---|---|---|
| 753416 | 7/1956 | United Kingdom . |
| 873006 | 7/1961 | United Kingdom . |
| 926543 | 5/1963 | United Kingdom . |
| 1274676 | 5/1972 | United Kingdom . |
| 1327877 | 8/1973 | United Kingdom . |

Primary Examiner—William R. Cline
Assistant Examiner—H. Jay Spiegel

[57] ABSTRACT

A control valve for fluids has two relatively rotatable plates, each having ports which cooperate to control fluid flow. The plates are biased towards one another, and one of the plates is provided with lands round its ports, these lands creating a space between the plates, to which space the fluid pressure at the valve inlet is admitted. The pressure between the plates opposes the inlet pressure acting on one of the plates, and the areas of the aforesaid one plate subjected to the inlet pressure are selected so as to produced a desired force between the plates.

11 Claims, 5 Drawing Figures

CONTROL VALVES FOR FLUIDS

This invention relates to control valves for fluids.

According to the invention a control valve for fluids comprises a body having an inlet and an outlet, a bore communicating with said inlet, a control element slidable in said bore, a port plate including first port means located between said control element and said outlet, opposed faces of said port plate and control element being mutually engageable and lying in planes substantially perpendicular to the axis of said bore, a passage through said control element from said bore and opening on to said control element face to define a second port means, means for causing relative sliding between said opposed faces, said sliding resulting in variation of the overlapping areas of said first and second port means, a raised land surrounding one of said port means and defining one of said opposed faces.

In a preferred embodiment said first port means comprises a plurality of first ports and said second port means comprises a corresponding number of second ports.

Figure 2:
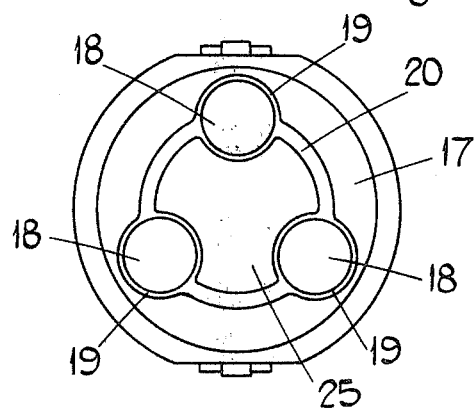
Figure 3:
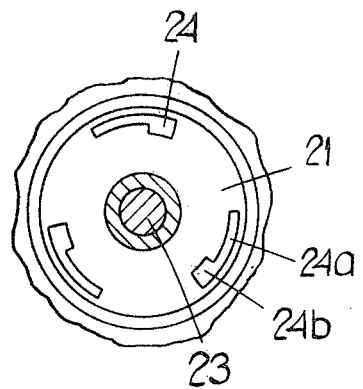
Figure 4:
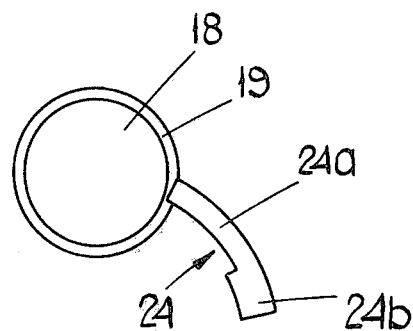
Figure 5:
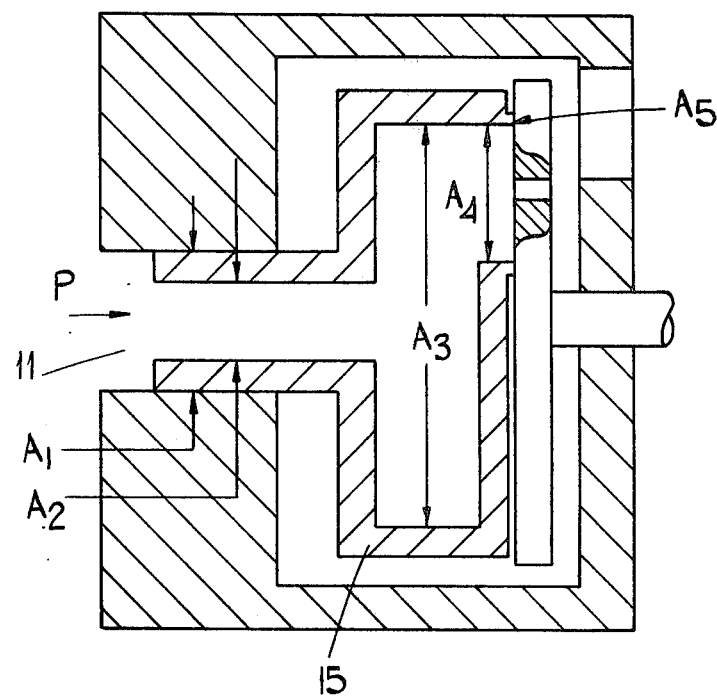

An embodiment of the invention will now be described by way of example only and with reference to the accompanying drawings in which:

FIG. 1 shows, somewhat diagrammatically, a longitudinal section through a valve, FIGS. 2 and 3 are part-sections on the corresponding lines in FIG. 1, FIG. 4 shows, diagrammatically, the positions of two parts of the valve at one extremity of their relative movement, and FIG. 5 is a diagram indicating the pressure-balance principle of the valve.

As shown in FIGS. 1 to 4 the valve has a body 10 which has an inlet 11, an outlet 12 and a chamber 13 between the inlet and outlet. A bore 14 interconnects the inlet 11 and chamber 13 and a valve control element 15 is sealingly slidable in the bore 14.

The valve control element 15 comprises a cup-shaped member 16 which is mounted for sliding movement in the bore 14 but is restrained against rotation relative to the body 10. Element 15 also comprises a control plate 17 sealingly secured within the larger end of the member 16 and provided, as shown in FIG. 2, with three equi-angularly spaced ports 18.

Surrounding each of the ports 18 is a narrow, raised land 19, the lands 19 being joined by a reinforcing land 20 which is of equal height, but greater width, than the lands 19.

The axially-directed faces of the lands 19, 20 engaged the opposed face of a port plate 21 which is supported by a thrust bearing 22 in the body 10 and is rotatable by means of a shaft 23 which extends sealingly through the body 10. The control element 15 is biased by means of a spring 26 into engagement with the port plate 21. The faces of the lands 19, 20 and the opposed face of the port plate 21 lie in a plane which is perpendicular to the axis of the bore 14.

In use the pressure P at inlet 11 acts between the surfaces of the lands 19 and the surface of the port plate 21 to urge the control element away from the port plate 21, against the spring 24.

There is a pressure drop across the face of each of the lands 19, and in practice the force urging the lands 19 away from the port plate 21 is equal the product of inlet pressure P and half the land areas $A_5$. The total area of the ports 18, together with half the land area $A_5$ is not greater than the cross-sectional area of the bore 14, and not less than 95% of the area of the bore 14.

In a particular case, where the sum of the total area of the ports 18 and of half the land areas $A_5$ are together equal to the area of the bore 14, variations in fluid pressure P at the inlet 11 do not materially affect the axial force applied to the control element 15. This may more readily be understood with reference to FIG. 5. The force R, due to the pressure P at the inlet 11 and urging the control element 15 to the right is proportional to:

$$A_1 - A_2 + A_3 - A_4 \qquad (1)$$

and the force L urging element 15 to the left is proportional to:

$$A_3 - A_2 + \tfrac{1}{2}A_5 \qquad (2)$$

But $A_1 = A_4 + \tfrac{1}{2}A_5$
whence (1) becomes: $A_3 - A_2 + \tfrac{1}{2}A_5$
whereby force R = force L.

It will be understood that in other embodiments area $A_1$ may be slightly more than, or slightly less than $A_4 + A_5$, in order to provide a small pressure-operated bias towards, or away from, the port plate 21.

In a preferred embodiment area $A_1$ is not less than 1.01 and not greater than 1.04 of the sum of the areas $A_4$ and $\tfrac{1}{2}A_5$ as aforesaid.

As shown in FIG. 3 the port plate 21 has three ports 24 which are arcuate about the axis of rotation of the plate 21. Each of the ports 24 has a portion 24a which is relatively narrow radially, and a portion 24b which is wider than the reinforcing land 20. FIG. 4 shows a port 18 and a port 24 with the port plate 21 in one of its limiting angular positions, corresponding to complete closure of the valve. In the other limiting angular position the portion 24b continues to extend outwardly of the land 19, and the zone 25 within the lands 19, 20 is thus at all times in communication with the outlet 12. Fluid passing, in use, across the lands 19 on to the area of the reinforcing land 20, rapidly falls to the pressure at the outlet 12. The land 20 thus plays no part in urging the control element 15 against the spring 26.

The port plate 21 is rotatable by means of a suitable actuator 27 which is conveniently powered by an electrical stepper motor. The actuator 27 includes stops to define the limiting positions of port plate 21, and may incorporate gearing to provide more precise control of the valve in response to input signals.

The spring 26 provides an axial force which maintains the control element 15 in engagement with the port plate 21, this axial force being sufficient to prevent substantial leakage between the element 15 and plate 21.

Since, in the preferred embodiment, the area $A_1$ of the bore 14 is between 1.01 and 1.04 times the sum of the areas $A_4$ of the ports 18 and of half the areas $A_5$ of the lands 19, an increase in inlet pressure P urges the control element 15 towards the port plate 21 with increasing force. The sealing characteristics of the arrangement may thereby be preserved at increasing inlet pressure.

Additionally, since the only fluid pressure acting on the control element 15 is the inlet pressure P, the force on the element 15 does not vary significantly with changes in flow through the valve.

In use, the edges of the lands can cut through any particles of contaminant which may adhere to the face of the plate 21. Moreover, the provision of narrow lands 19, across which there is a pressure drop, has the effect that there is fluid flow between the faces of the lands 19 and the opposing face of the port plate 21. Any particles of contaminant are thus readily removed from between the co-operation valve faces. The provision of the reinforcing land 20 has the effect of reducing the intensity of the pressure between the opposed faces 19, 20 and 21, whereby wear on these faces is reduced.

I claim:

1. A control valve for fluids comprising a body having an inlet and an outlet, a bore through which fluid can flow from said inlet, a control element sealingly slidable in said bore, a port plate including first port means located between said control element and said outlet, means for maintaining opposed faces of said port plate and control element in mutual sliding and sealing engagement in a plane substantially perpendicular to the axis of said bore, a passage through said control element from said bore and opening onto said control element face to define a second port means, means for causing relative sliding between said opposed faces, said sliding resulting in variation of the overlapping areas of said first and second port means, a raised land surrounding one of said port means and defining one of said opposed faces, the cross sectional area of said bore being substantially equal to the sum of the cross sectional areas of one of the port means and of half the area of the face defined by said land so that variations in fluid pressure at said inlet do not materially affect axial force applied to said control element.

2. A control valve as claimed in claim 1 in which the cross-sectional area of said bore is between 1.01 and 1.04 times said sum.

3. A control valve as claimed in claim 1 in which said first port means comprises a plurality of first ports, and said control element comprises a plate having a plurality of second ports equal in number to said first ports.

4. A control valve as claimed in claim 1, in which said port plate and said control element are relatively rotatable.

5. A control valve as claimed in claim 4 in which said first ports are arcuate about the axis of said relative rotation.

6. A control valve as claimed in claim 1 comprises an electric motor driving coupled to said port plate.

7. A control valve as claimed in claim 6 in which said motor is a stepping motor.

8. A control valve for fluids, comprising a body having an inlet and an outlet, a bore through which fluid can flow from said inlet, a control element sealingly axially slidable in said bore, said control element having a center, a port plate between said control element and said outlet, means for maintaining opposed faces of said port plate and said control element in mutual sliding contact, means for causing relative sliding between said control element and said port plate, a plurality of spaced first ports in said control element, said first ports communicating with said bore and opening on to said control element face, a corresponding number of second ports in said port plate, said second ports opening onto said port plate face, said relative sliding causing variation in the areas of overlap between said first and second ports, said control element face being provided with first raised lands surrounding said first ports and second raised lands each extending between adjacent first ports and connecting said first raised lands together to define a zone which is enclosed by said lands between said control element and said port plate and which is isolated from said inlet in all relative operating positions of said control element and said port plate by said lands, said second raised lands all being arcuate and all having a common center of curvature which is located near said control element center.

9. A valve as claimed in claim 8, in which the cross sectional area of said bore is substantially equal to the sum of the cross sectional areas of said one of the port means and of half the area of the face provided by said lands so that variations in fluid pressure at said inlet do not materially affect axial force applied to said control element.

10. A valve as claimed in claim 8 which includes means for providing communication between said enclosed zone and said outlet, in all relative positions of said port plate and said control element.

11. A valve as claimed in claim 9 in which said means for providing communication between said enclosed zone and said outlet comprises portions of said second ports.

* * * * *